UNITED STATES PATENT OFFICE.

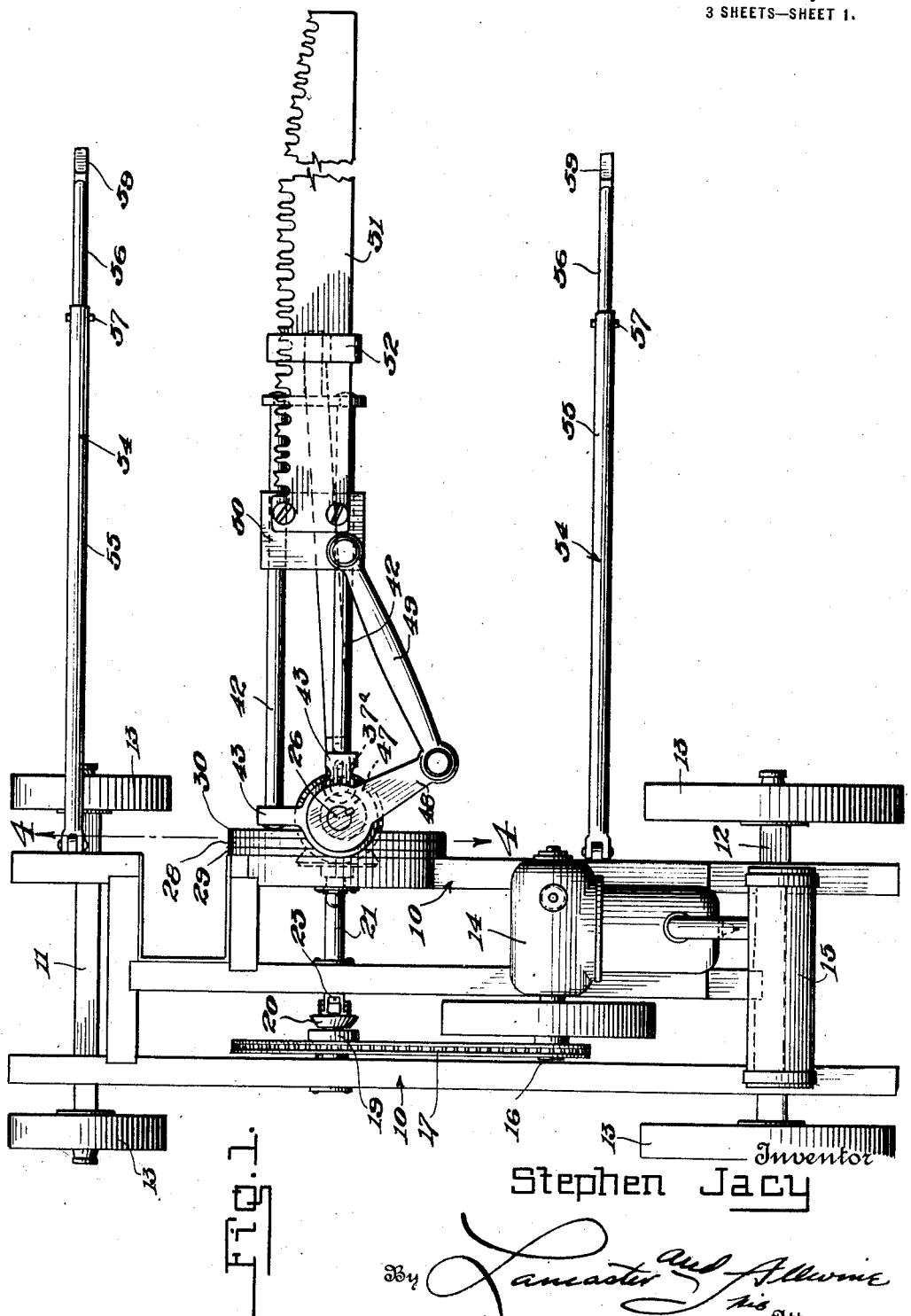

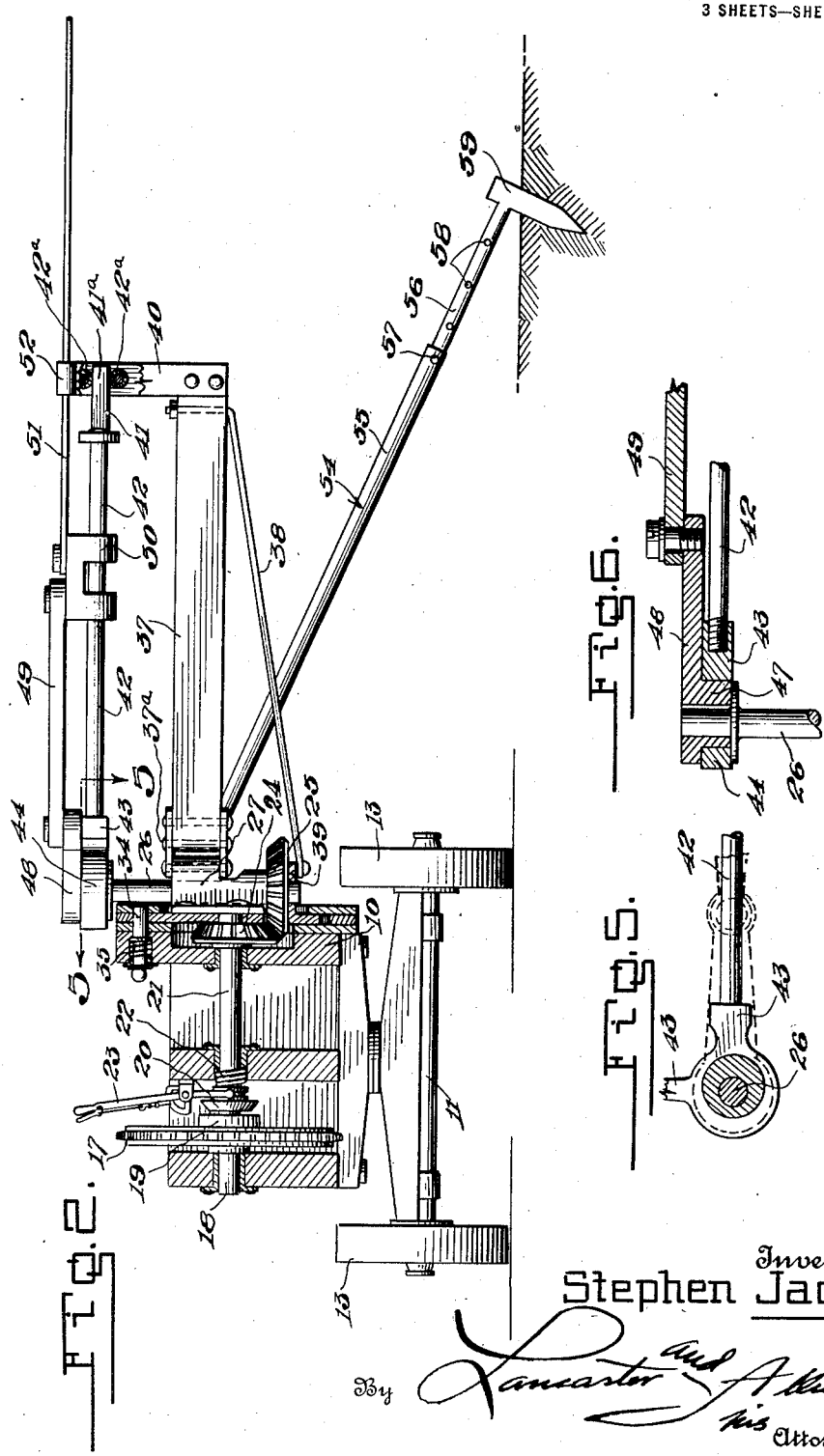

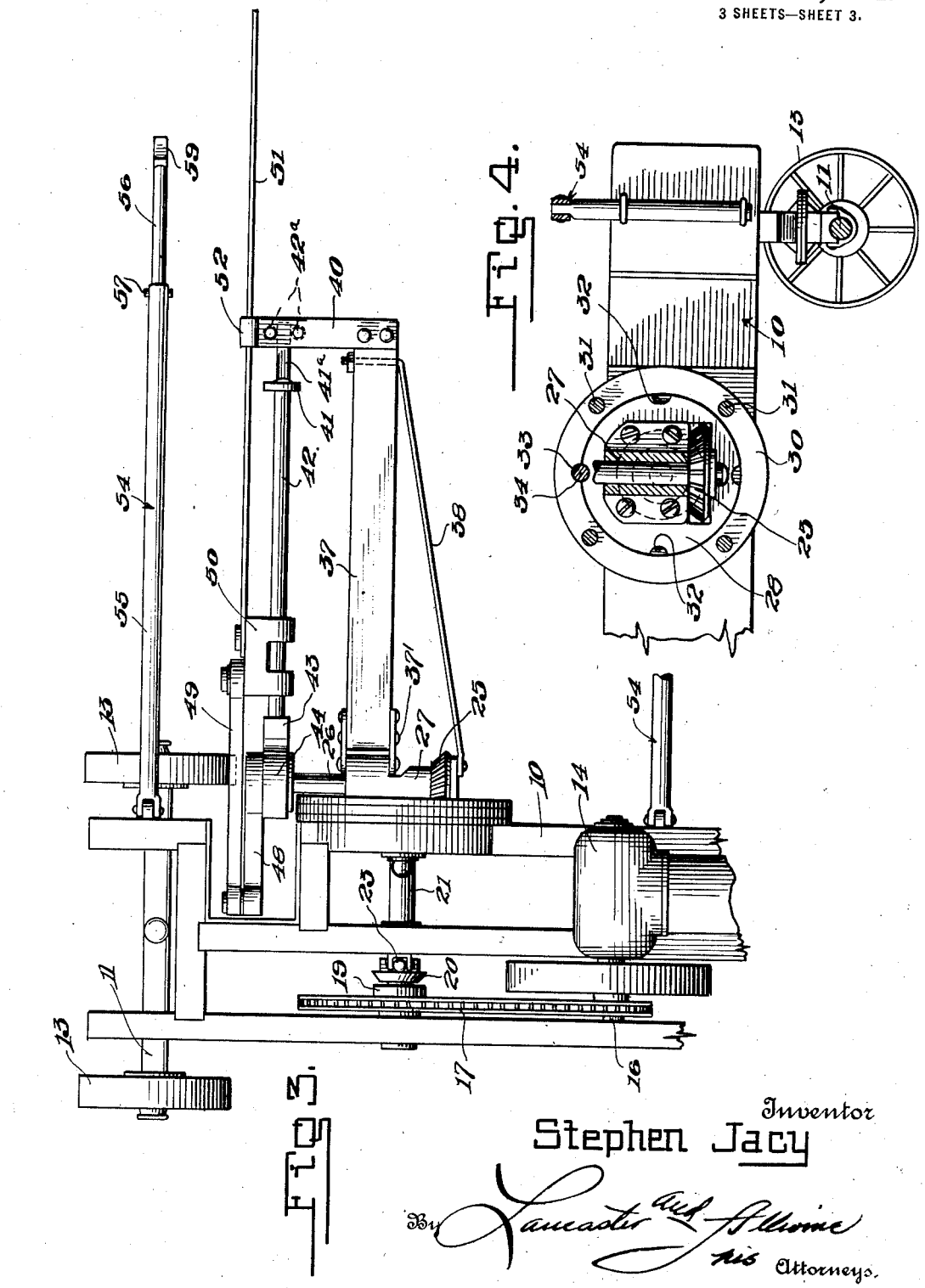

STEPHEN JACY, OF EIGHT POINT, MONTANA.

PORTABLE DRAG-SAW.

1,367,480.  Specification of Letters Patent.  Patented Feb. 1, 1921.

Application filed August 11, 1919. Serial No. 316,612.

*To all whom it may concern:*

Be it known that I, STEPHEN JACY, a citizen of the United States, residing at Eight Point, in the county of Valley and State of Montana, have invented certain new and useful Improvements in Portable Drag-Saws, of which the following is a specification.

This invention relates to drag saws, of the portable type, and an object of the invention is to provide means whereby the reciprocatory saw and its operating means may be rotated about a fixed axis for positioning the blade in an upper and a lower horizontal position for felling trees, or for positioning it vertically, to saw logs, or cross cut timbers, and to provide means for reciprocating the saw which will be operatively connected thereto, under all adjustments of the saw.

More specifically, the invention comprehends the provision of a portable supporting structure carrying suitable operating means for the saw and having a pair of spaced rings attached at one side thereto, between which a disk is rotatably mounted, which disk carries the frame which supports the saw blade for its reciprocatory movement permitting the carrying frame and saw blade to be rotated about the axis of said ring to adjust the position of the saw depending upon the work to be performed, and also to provide beveled gears, one of which is connected to a suitable prime mover and the other to the saw carrying cross head which are always in mesh during adjustment of the saw blades, thereby eliminating adjustment of the operating means of the saw, and further to provide means for maintaining the saw carrying frame in adjusted position.

Other objects of the invention will appear in the following detailed description taken in connection with the accompanying drawings, and in which drawings:

Figure 1 is a top plan of the improved portable drag saw.

Fig. 2 is a vertical section through the supporting frame of the drag saw illustrating the saw carrying frame in side elevation.

Fig. 3 is a fragmentary top plan of the portable drag saw, illustrating the saw in vertical position for cross cutting timbers.

Fig. 4 is a fragmentary section taken on the line 4—4 of Fig. 1.

Fig. 5 is a detail horizontal section taken on the line 5—5 of Fig. 2.

Fig. 6 is a detail section through the coupling for reciprocating the saw blade.

Referring more particularly to the drawings, 10 indicates the supporting frame of the portable drag saw, which carries the usual front and rear axle structure 11 and 12 upon which are mounted the supporting wheels 13. The supporting frame 10 also carries a prime mover 14, such as an internal combustion engine, which receives its fuel from a suitable supply tank 15. The operating shaft 16 of the engine 14 is connected, by a sprocket and chain transmission structure 17 or any other analogous transmitting structure with a shaft 18 which carries a clutch section 19 adapted to co-act with a shiftable clutch section 20 feathered upon a shaft 21. A spring 22 is provided for normally urging the clutch section or cone 20 into operative engagement with the clutch section 19, and a hand lever 23 is provided for moving the clutch section 20 out of engagement with the clutch section 19 and holding it in such position.

The shaft 21 has a beveled gear 24 mounted thereon, which meshes with a beveled gear 25. The beveled gear 25 is mounted upon the lower end of a vertical shaft 26. The shaft 26 is rotatably supported by a bearing 27, and this bearing is attached in any suitable manner to a disk 28. The disk 28 is rotatably supported between rings 29 and 30 which are attached to the frame 10 in any suitable manner such as by bolts, 31. The disk 28 is provided with a plurality of spaced openings 32, any one of which is adapted to aline with cut out portions 33 in the rings 29 and 30 for permitting the insertion of the pin 34 therethrough, to hold the disk against rotary movement. The pin 34 is slidably carried by the frame 10 and the spring 35 is coiled about the same for urging it outwardly into position for insertion through the openings 32 and 33 and when it is desired to rotate the disk 28 for adjusting the portion of the shaft 26, it is necessary to withdraw the pin 34 against the action of the spring 35.

The bearing 27 has a frame 37 pivotally connected thereto, which frame is braced by a suitable bracing rod 38, the lower inner end of which is connected to the bracket 39 which supports the lower end of the shaft 26. The frame 37 has an upright 40 attached to its outer end, which supports a suitable bracket 41. The outer end of guide rods 42 are attached to the bracket 41, while their inner ends are attached to radially extending lugs 43 formed upon a collar 44 which is mounted about an outer or upper end of the shaft 26, it forming a bearing for the depending collar 47 of the bell crank arm 48 which bell crank arm is preferably keyed to the shaft 26. A pitman or connecting rod 49 is connected to the outer end of the bell crank 48 and to a cross head 50 which is slidably supported by the guide rods 42. The saw blade 51 which is of any approved type of drag saw, is detachably connected to the cross head 50 and it travels through a suitable guide structure 52 which is supported by the upper end of the upright 40.

The disk 28 is preferably provided with openings 32 spaced so that when the pin 34 is inserted therethrough the saw blade 51 will be supported in an upper or a lower horizontal position or in a vertical position. When the saw blade 51 is supported in its upper horizontal position it is particularly adapted for felling trees, approximately two feet above the ground. However, it is quite frequently desirable to fell a tree very close to the ground leaving no stump, and in such cases the disk 28 is rotated, to position the saw blade in its lower horizontal position, thereby permitting the sawing off or felling of a tree close to the ground. In sawing logs or in cross cutting timbers, the saw blade 51 is supported in the vertical position at which time the shaft 26 and upright 40 lie in horizontal positions.

Suitable anchoring devices 54 are provided, each of which comprises a receiving section 55 which is pivotally connected to the supporting frame 10 and telescopically receives the inserting section 56, which is held in adjusted position with respect to the section 55 by means of a pin 57, which extends transversely to any one of a series of openings 58, formed in the member 56 and through openings formed in the lower free end of the section 55. The sections 56 have anchoring heads 59 upon their outer ends for embedding in the ground, log or tree to securely anchor the portable drag saw during use.

In operation, the shaft 26 is rotated from the engine 14, through the medium of the beveled gears 24 and 25, and this rotation of the shaft will reciprocate the saw blade 51 through the medium of the bell crank 48 and coupling rod 49. During the reciprocation of the saw blade 51 it will be moved in an oscillatory manner to permit the thorough cleaning of the kerf and also to impart substantially the same movement to the saw blade as is imparted thereto by manual labor, by means of the eccentric collar 47 which engages in the collar 44, thus rocking the saw carrying blade including the member 37 and brace 40. The shank 41$^a$ of the guide rod carrying bracket 41 engages, slidably between spaced rollers 42$^a$ carried by the bracket 40, for decreasing to a material extent, friction between the bracket 41 and brace structure 40, during the longitudinal movement of the bracket, and the rods carried thereby which would be occasioned under the rocking movement of the saw carrying frame. By particular reference to Figs. 1 and 2 of the drawings, it will be noted that the pivoting point 37$^a$ of the brace 37 is positioned outwardly of the axis of the shaft 26 and consequently of the pivot of the shaft, so as to permit the unimpeded oscillatory movement of the frame and consequently the saw blade during operation, and under all of the various adjustments of the saw carrying frame about the shaft 21 as an axis to regulate the position of the saw 51 in accordance with the work to be performed.

Changes in details may be made without departing from the spirit of this invention, but;

I claim:

1. In a portable sawing machine, the combination of a supporting frame, a disk rotatably carried by the supporting frame, a bearing secured to the disk, means for holding the disk in adjusted position on the frame, a shaft rotatably carried by the bearing, a supporting arm pivotally secured to the bearing, guide arms arranged above the supporting arm and receiving said rotatable shaft, an eccentric mounted on the upper end of the rotatable shaft and engaging said guide arm, an upright carried by the outer end of the supporting arm and arranged to slidably support the guide arm, a saw guide carried by the upright, a cross head slidably mounted on the guide arm, a crank arm secured to the upper end of the shaft, and a connecting link secured to the crank arm and to the cross head.

2. In a portable sawing machine, the combination of a supporting frame, a bearing rotatably carried by the supporting frame, means for holding the bearing in adjusted position on the frame, a shaft rotatably carried by the bearing, means for rotating the shaft, a supporting arm pivotally secured to the bearing, a guide arm, arranged in parallel relation to the supporting arm, means for transmitting a rocking motion to the guide arm from said shaft, an upright carried by the supporting arm arranged for slidably receiving said guide arm, a cross head slidably mounted on said guide arm, a saw carried by said cross head, and means operatively connecting the cross head with the shaft.

STEPHEN JACY.